(12) United States Patent
Kazmierski et al.

(10) Patent No.: US 9,547,214 B2
(45) Date of Patent: Jan. 17, 2017

(54) DEVICE FOR TRANSMITTING AND/OR MODULATING OPTICAL SIGNALS WITH PASSIVE PHASE SHIFTERS

(71) Applicant: Commissariat à l'Energie Atomique et aux Energies Alternatives ("CEA"), Paris (FR)

(72) Inventors: Christophe Kazmierski, Marcoussis (FR); Alexandre Garreau, Marcoussis (FR)

( * ) Notice: Subject to any disclaimer, the term of this patent is extended or adjusted under 35 U.S.C. 154(b) by 25 days.

(21) Appl. No.: 14/624,090

(22) Filed: Feb. 17, 2015

(65) Prior Publication Data

US 2015/0234253 A1    Aug. 20, 2015

(30) Foreign Application Priority Data

Feb. 18, 2014  (EP) ..................................... 14305227

(51) Int. Cl.
| | | |
|---|---|---|
| *G02F 1/035* | (2006.01) | |
| *G02F 1/225* | (2006.01) | |
| *G02F 1/00* | (2006.01) | |
| *G02F 1/21* | (2006.01) | |
| *G02F 1/017* | (2006.01) | |

(Continued)

(52) U.S. Cl.
CPC ........... *G02F 1/2257* (2013.01); *G02F 1/0018* (2013.01); *G02F 1/01708* (2013.01); *G02F 1/17* (2013.01); *G02F 1/21* (2013.01); *B82Y 20/00* (2013.01); *G02F 2001/212* (2013.01); *Y10S 977/755* (2013.01)

(58) Field of Classification Search
None
See application file for complete search history.

(56) References Cited

U.S. PATENT DOCUMENTS 6,253,000 B1 *  6/2001  Madsen ............. H04Q 11/0001
385/16
6,377,722 B1 *  4/2002  Hoekstra ............. G02B 6/12011
385/15

(Continued)

FOREIGN PATENT DOCUMENTS

EP     2 141 833         1/2010
JP     200366387 A  *   3/2003  ............... G02F 1/01

OTHER PUBLICATIONS

Search Report dated Jun. 27, 2014 from corresponding European Application No. 14 305 227.2 filed Feb. 18, 2014 (8 pages including English translation).

(Continued)

*Primary Examiner* — Tina Wong
(74) *Attorney, Agent, or Firm* — Brinks Gilson & Lione; G. Peter Nichols

(57) ABSTRACT

A device for transmitting and/or modulating in-phase and quadrature optical signals generated by an optical source. This device includes modulators each arranged for modulating intensity of optical signals depending on commands, and at least three main multi-mode interferometers set in series and arranged for transforming in combination a received optical signal with an initial phase state into a final optical signal with a final phase state differing from this initial phase state by an accumulated phase shift chosen from a group including 0, $\pi/2$, $\pi$ and $3\pi/2$ and depending from the intensity modulations carried out by the modulators.

7 Claims, 2 Drawing Sheets

(51) Int. Cl.
    *G02F 1/17*        (2006.01)
    *B82Y 20/00*       (2011.01)

(56) References Cited

U.S. PATENT DOCUMENTS

| | | | | |
|---|---|---|---|---|
| 6,603,893 B1* | 8/2003 | Liu | ............... | G02F 1/3136 |
| | | | | 385/15 |
| 8,023,822 B2* | 9/2011 | Costa | ............ | G02B 6/29352 |
| | | | | 398/68 |
| 8,295,710 B2 | 10/2012 | Marcus | | |
| 2004/0096154 A1* | 5/2004 | Bernasconi | ...... | G02B 6/12019 |
| | | | | 385/37 |
| 2005/0053322 A1* | 3/2005 | Jenkins | ............ | G02B 6/2813 |
| | | | | 385/22 |
| 2009/0169148 A1 | 7/2009 | Doerr et al. | | |
| 2011/0164305 A1 | 7/2011 | Winter | | |
| 2013/0044974 A1* | 2/2013 | Doerr | ............... | H04B 10/615 |
| | | | | 385/3 |
| 2015/0234253 A1* | 8/2015 | Kazmierski | .......... | G02F 1/2257 |
| | | | | 385/3 |

OTHER PUBLICATIONS

Article, Concotti, "New planar architectures for optical digital modulators", 2012 International Conference on Photonics in Switching (PS), Sep. 11, 2012, pp. 1-3, XP032487557 (the whole document).

* cited by examiner

DEVICE FOR TRANSMITTING AND/OR MODULATING OPTICAL SIGNALS WITH PASSIVE PHASE SHIFTERS

This application claims priority to European patent application No. 14 305 227.2 filed on Feb. 18, 2014, the entire contents of which are incorporated herein by reference.

BACKGROUND

The present invention relates to devices intended for transmitting and/or modulating in-phase and quadrature (or IQ) optical signals generated by an optical source.

IQ (In-phase and Quadrature) optical multilevel vector modulation formats such as Quadrature Phase-Shift Keying (QPSK) or Quadrature Amplitude Modulation (QAM) are notably used in telecommunication equipment and should be generalized in the coming years. As known by those skilled in the art the transmitters of the art implementing a QPSK/QAM function employ almost exclusively $LiNbO_3$ Mach-Zehnder phase modulator arrangements (or nested Mach-Zehnders) with an external laser source, and sometimes GaAs or InP material based phase modulators.

These known technologies lead to large size and large energy consuming devices, and their speed operation appears to be limited by the driving power which notably increases when it becomes greater than 25/32 GBaud.

These drawbacks can be overcome by a new emerging technology based on prefixed optical phase switching with Electro-Absorption Modulators (or EAMs) made, for instance, of material of the InP family and integrated in interferometric waveguide arrangements. A footprint divided by 50 and an energy consumption divided by at least 4 are expected with this emerging technology.

However, with such an emerging technology, the optical phase state is extremely sensitive to the temperature due to thermally induced material index changes. Moreover, a wavelength channel change produces a phase state change because the optical index (i.e. the optical path (length times index)) is also wavelength dependent. For instance, a 10 nm optical path change may induce a prohibitive phase error that reduces the transmission performance. Therefore, complex monitoring and feedback optical/electronic circuits must be used for actuating the phase shifters, which increases the cost and then may render this technology unadapted to technical domains very sensitive to costs.

SUMMARY

So an object of this invention is to improve the situation by suppressing the phase control complexity and/or reducing circuit size and power consumption.

In an embodiment, a device is intended for transmitting and/or modulating in-phase and quadrature optical signals generated by an optical source, and comprises: modulators each arranged for modulating intensity of optical signals depending on commands, and at least three main multi-mode interferometers set in series and arranged for transforming in combination a received optical signal with an initial phase state into a final optical signal with a final phase state differing from this initial phase state by an accumulated phase shift chosen from a group comprising $0$, $\pi/2$, $\pi$ and $3\pi/2$ and depending from the intensity modulations carried out by the modulators.

The device may include additional characteristics considered separately or combined.

Its modulators may be electro-absorption modulators (or EAMs) located between outputs of at least one main multi-mode interferometer and inputs of at least another main multi-mode interferometer; its optical source may be a distributed feedback laser.

Its optical source may be tunable.

It may comprise at least one part comprising i) a first auxiliary multi-mode interferometer comprising one input for receiving optical signals and two outputs delivering optical signals without phase shift, ii) two first main multi-mode interferometers set in parallel and each comprising one input receiving an optical signal without phase shift and two outputs delivering two optical signals with phase shifts respectively equal to $0$ and $\pi/2$, iii) two second main multi-mode interferometers set in parallel and each comprising two inputs coupled respectively to the outputs of a first main multi-mode interferometer via two modulators and one output delivering an optical signal with a phase shift equal either to $0$ or to $\pi$, and iv) a third main multi-mode interferometer comprising two inputs connected respectively to the outputs of the two second main multi-mode interferometers and one output delivering an optical signal with an accumulated phase shift equal either to $0$, or to $\pi/2$, or to $\pi$, or else to $3\pi/2$.

It may comprise i) two parts set in parallel, ii) a second auxiliary multi-mode interferometer comprising one input for receiving optical signals generated by the optical source and two outputs delivering optical signals without phase shift for the two parts, and iii) a control means coupled to the outputs of the third main multi-mode interferometers and arranged for combining the optical signals with their delivered accumulated phase shift; each part may comprise an amplifier arranged for amplifying each optical signal with an accumulated phase shift delivered by the output of its third main multi-mode interferometer.

In a first variant it may comprise i) a first main multi-mode interferometer comprising one input receiving an optical signal generated by the optical source and four outputs delivering four optical signals with phase shifts respectively equal to $\pi/2$, $0$, $0$ and $\pi/2$, ii) a second main multi-mode interferometer comprising four inputs coupled respectively to the outputs of a first main multi-mode interferometer via four modulators and two outputs each delivering an optical signal with a phase shift equal either to $0$ or to $\pi$, and iii) a third main multi-mode interferometer comprising two inputs connected respectively to the outputs of the second main multi-mode interferometer and one output delivering an optical signal with an accumulated phase shift equal either to $0$, or to $\pi/2$, or to $\pi$, or else to $3\pi/2$.

In a second variant it may comprise i) an auxiliary multi-mode interferometer comprising one input for receiving optical signals generated by the optical source and two outputs delivering optical signals without phase shift, ii) a first main multi-mode interferometer comprising two inputs receiving the optical signals without phase shift and four outputs delivering four optical signals with phase shifts respectively equal to $\pi/2$, $0$, $0$ and $\pi/2$, iii) a second main multi-mode interferometer comprising four inputs coupled respectively to the outputs of the first main multi-mode interferometer via four modulators and two outputs each delivering an optical signal with a phase shift equal either to $0$ or to $\pi$, and iv) a third main multi-mode interferometer comprising two inputs connected respectively to the outputs of the second main multi-mode interferometer and one output delivering an optical signal with an accumulated phase shift equal either to $0$, or to $\pi/2$, or to $\pi$, or else to $3\pi/2$.

In the first and second variant it may comprise an amplifier arranged for amplifying each optical signal with an accumulated phase shift delivered by the output of the third main multi-mode interferometer.

Each multi-mode interferometer may be defined on an InP substrate, and each modulator may comprise a waveguide core made of AlGaInAs/InP quantum well(s) defined on this InP substrate.

BRIEF DESCRIPTION OF THE DRAWINGS

Some embodiments of device in accordance with an embodiment of the present invention are now described, by way of example only, and with reference to the accompanying drawings, in which.

DETAILED DESCRIPTION

Hereafter is notably disclosed a device 1 intended for transmitting and/or modulating in-phase and quadrature (or IQ) optical signals generated by an optical source 2.

Figure 1:
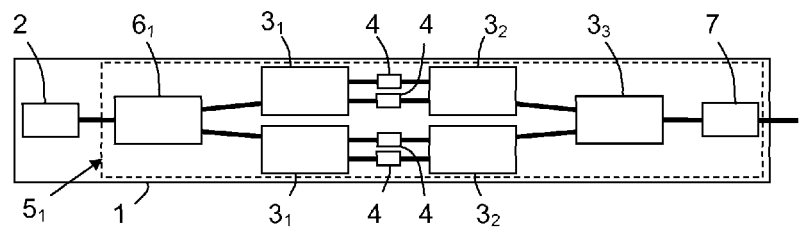
FIG. 1 schematically and functionally illustrates a first example of embodiment of a device according to the invention.
Figure 2:
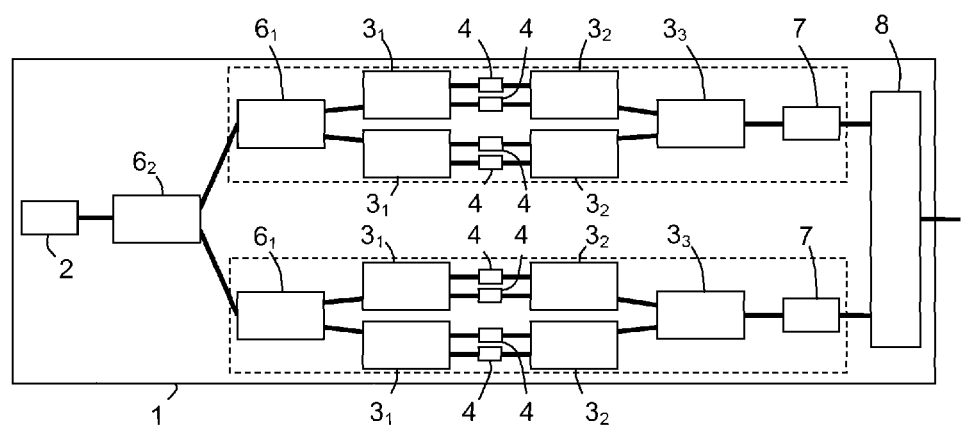
FIG. 2 schematically and functionally illustrates a second example of embodiment of a device according to the invention.
Figure 3:
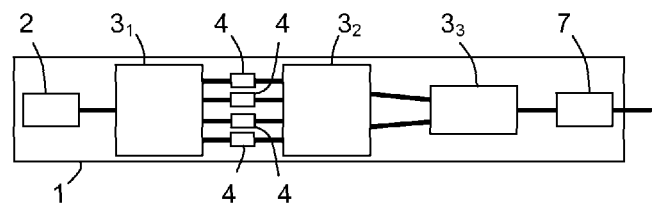
FIG. 3 schematically and functionally illustrates a third example of embodiment of a device according to the invention.

Examples of a device 1 according to an embodiment of the invention are schematically illustrated in FIGS. 1 to 3. As illustrated in these non-limiting examples, such a device 1 comprises modulators 4 and at least three main multi-mode interferometers (or MMIs) $3_j$ (with j=1 to 3) set in series.

The optical source 2, which may be part of the device 1, may be a distributed feedback laser (or DFB) with a single wavelength that may be advantageously tunable. This distributed feedback laser (or DFB) is preferably integrated, as illustrated. But it could be also external.

Each modulator 4 comprises an input connected to an output of a (first) main multi-mode interferometer $3_1$ and an output connected to an input of a (second) main multi-mode interferometer $3_2$, and is arranged for modulating intensity of the optical signals it receives onto its input, depending on received commands. For instance, each modulator 4 may be an electro-absorption modulator (or EAM). These electro-absorption modulators 4 are preferably integrated, as illustrated. But they could be also external. In variants, each modulator 4 could be, for instance, an electro-optic modulator (or EOM) or a Mach-Zehnder modulator, preferably integrated.

Each modulator 4 preferably acts as an on/off switch regarding the intensity of the optical signal it receives on its input.

The main multi-mode interferometers (or MMIs) $3_j$ are arranged for transforming in combination (i.e. together) a received optical signal with an initial phase state into a final optical signal with a final phase state that differs from this initial phase state by an accumulated phase shift that is chosen from a group comprising 0, $\pi/2$, $\pi$ and $3\pi/2$ and depends from the intensity modulations carried out by the modulators 4. It must be understood that this accumulated phase shift results from each phase shift introduced by each main multi-mode interferometer (or MMI) $3_j$.

It is recalled that a multi-mode interferometer (or MMI) is an integrated device that comprises either a single input receiving an optical signal and two or four outputs delivering respectively optical signals with phase states equal to the phase state of the received optical signal or differing from the phase state of the received optical signal by a phase shift equal to 0 or $\pi/2$, or two or four inputs receiving optical signals and a single output delivering an optical signal with a phase state equal to the phase state of the received optical signal or differing from the phase state of the received optical signal by a phase shift equal to 0 or $\pi/2$.

For instance, a [1:2] MMI may receive an optical signal with an initial phase state and may deliver two optical signals either with the initial phase state or with respectively the initial phase state and a final phase state with a $\pi/2$ phase shift. A [2:1] MMI may receive two optical signals with the same initial phase state and may deliver an optical signal with this initial phase state, or may receive two optical signals with first and second initial phase states differing from $\pi/2$ and may deliver an optical signal either with the first initial phase state or with a final phase state with a $\pi$ phase shift. A [1:4] MMI may receive an optical signal with an initial phase state and may deliver two optical signals with the initial phase state and two optical signals with a final phase state with a $\pi/2$ phase shift. A [4:1] MMI may receive two optical signals with a first initial phase state and two optical signals with a second initial phase state with a $\pi/2$ phase shift, and may deliver an optical signal with the first initial phase or with a final phase state with a $\pi$ phase shift.

The phase shifts are produced by interferences in the MMI and therefore are very robust versus index, wavelength and temperature changes. Therefore the main MMIs $3_j$ realize together the required prefixed phase states in a passive way (i.e. without active control and electrodes). Due to the use of MMIs the device 1 may have strictly equal arms (or optical paths) providing good fabrication control/yield and temperature/wavelength resiliency. The phase states are then switched on/off with the amplifiers 4 to produce phase modulation formats. QAM format will simply require multi-level electronics to drive the amplifiers 4 (acting as switches).

In the first example of embodiment schematically illustrated in FIG. 1, the device 1 comprises only one part $5_i$ comprising notably a first auxiliary multi-mode interferometer $6_1$, two first main multi-mode interferometers $3_1$, four modulators 4, two second main multi-mode interferometers $3_2$, and a third main multi-mode interferometer $3_3$. Such a device 1 defines a single emission polarization transmitter.

The first auxiliary multi-mode interferometer $6_1$ comprises one input for receiving optical signals and two outputs delivering optical signals without phase shift. So, it acts as a [1:2] optical signal splitter.

The two first main multi-mode interferometers $3_1$ are set in parallel in two optical sub-paths. Each first main multi-mode interferometer $3_1$ comprises one input, receiving an optical signal without phase shift, and two outputs, delivering two optical signals with phase shifts respectively equal to 0 and $\pi/2$. So, they act as [1:2] optical signal splitters introducing 0 and $\pi/2$ phase shifts.

The two second main multi-mode interferometers $3_2$ are set in parallel in the two optical sub-paths. Each second main multi-mode interferometer $3_2$ comprises two inputs coupled respectively to the outputs of a first main multi-mode interferometer $3_1$ via two modulators 4 and one output delivering an optical signal with a phase shift equal either to 0 or to π. So, they act as [2:1] phase shifters introducing a 0 or π/2 phase shift.

The third main multi-mode interferometer $3_3$ comprises two inputs connected respectively to the outputs of the two second main multi-mode interferometers $3_2$ and one output delivering an optical signal with an accumulated phase shift equal either to 0, or to π/2, or to π, or else to 3π/2. So, it acts as a [2:1] phase shifter introducing a 0 or π/2 phase shift.

As illustrated in the non-limiting example of FIG. 1, the part $5_i$ may further comprise an amplifier 7 arranged for amplifying each optical signal with an accumulated phase shift, delivered by the output of the third main multi-mode interferometer $3_3$. Such an amplifier 7 may be, for instance, an integrated semiconductor optical amplifier (or SOA). But it could be also an external amplifier.

It is important to note that in a variant of embodiment the [1:2] first auxiliary multi-mode interferometer $6_1$ could be replaced by the third main multi-mode interferometer $3_3$ transformed into a [1:2] phase shifter introducing a 0 or π/2 phase shift, and the third main multi-mode interferometer 33 could be replaced by the first auxiliary multi-mode interferometer $6_1$ transformed into a [2:1] optical combiner.

So in the first example illustrated in FIG. 1 the IQ architecture is based on a phase shifting produced by two oppositely turned main MMIs $3_1$ and $3_2$. Each main MMI $3_1$ or $3_2$ produces a π/2 phase difference resulting in difference on the output. As only one EAM switch 4 is ON at a time, each pair of main MMIs $3_1$ and $3_2$ produces a data stream alternating phase states equal to 0 and π. The third main MMI $3_3$ allows obtaining a phase quadrature (π/2) at the input or output of the pairs. This allows the phase states of one pair to be shifted by π/2 versus the other pair. Depending on the EAM switch state, 4 different phase states corresponding to QPSK format (0, π/2, π, 3π/2) may be obtained. More generally, the quadrature MMIs allow generating all kind of vector formats by modulating EAM switches 4. For example QAM format is simply generated by driving the EAM switches 4 with multilevel electronics. IQ architecture cans also be used for analog type of vector signals in amplitude and phase space.

In the second example of embodiment schematically illustrated in FIG. 2, the device 1 comprises two parts $5_1$ and $5_2$ (=1 or 2), a second auxiliary multi-mode interferometer $6_2$ and a control means 8. Such a device 1 defines a dual (orthogonal) polarization IQ transmitter. This type of IQ transmitter allows to double the data rate on a single wavelength. Orthogonal polarization states can be simply managed at the receiver.

In this second example, each part $5_i$ is identical to the part $5_i$ described above with reference to FIG. 1. So, each part $5_i$ comprises notably a first auxiliary multi-mode interferometer $6_1$, two first main multi-mode interferometers $3_1$, four modulators 4, two second main multi-mode interferometers $3_2$, and a third main multi-mode interferometer $3_3$.

The two third main multi-mode interferometers $3_3$ may deliver respectively optical signals with different polarization states (one being perpendicular to the other) but the general case is they deliver the same polarization state most often of TE type (Transverse Electric).

The second auxiliary multi-mode interferometer $6_2$ comprises one input for receiving optical signals generated by the optical source 2 and two outputs delivering optical signals without phase shift for the two parts $5_1$ and $5_2$.

The control means 8 is coupled to the outputs of the two third main multi-mode interferometers $3_3$ and is arranged for combining the optical signals with accumulated phase shift and two different polarization states they deliver. For instance, it may comprise a polarization beam combiner.

In the case where the light delivered by the optical source 2 has two identical polarization states (TE, which is the most general case, or TM) the control means 8 may also comprise a polarization rotator. In a variant the polarization rotator could be located upward the second auxiliary multi-mode interferometer $6_2$ (in this case the control means 8 only acts as a combiner).

In the case where the light delivered by the optical source 2 has two different polarization states (TE and TM)), the device does not need any polarization rotator. Therefore the control means 8 only acts as a polarization combiner.

As in the first example of embodiment and as illustrated in FIG. 2, each part $5_i$ may further comprise an amplifier 7 arranged for amplifying each optical signal with an accumulated phase shift, delivered by the output of the third main multi-mode interferometer $3_3$. Such an amplifier 7 may be, for instance, an integrated semiconductor optical amplifier (or SOA). But it could be also an external amplifier.

Also as in the first example of embodiment, in a variant of embodiment the [1:2] first auxiliary multi-mode interferometer $6_1$ of each part $5_i$ could be replaced by the third main multi-mode interferometer $3_3$ of this part $5_i$ transformed into a [1:2] phase shifter introducing a 0 or π/2 phase shift, and the third main multi-mode interferometer $3_3$ of each part $5_i$ could be replaced by the first auxiliary multi-mode interferometer $6_1$ of this part $5_i$ transformed into a [2:1] optical combiner.

In this third embodiment the passive fixing of optical signal phases allows an important simplification if one compares to the state-of-the-art devices that require 8 phase controls/electrodes.

In the third example of embodiment schematically illustrated in FIG. 3, the device 1 comprises a first main multi-mode interferometer $3_1$, four modulators 4, a second main multi-mode interferometer $3_2$, and a third main multi-mode interferometer $3_3$.

The first main multi-mode interferometer $3_2$ comprises one input receiving the optical signal generated by the optical source 2 and four outputs delivering four optical signals with phase shifts respectively equal to π/2, 0, 0 and π/2. So, it acts as a [1:4] optical signal splitter introducing π/2, 0, 0 and π/2 phase shifts.

The second main multi-mode interferometer $3_2$ comprises four inputs coupled respectively to the outputs of the first main multi-mode interferometer $3_1$ via the four modulators 4 and two outputs each delivering an optical signal with a phase shift equal either to 0 or to π. So, it acts as a [4:1] phase shifter introducing a π/2 or 0 phase shift.

The third main multi-mode interferometer $3_3$ comprises two inputs connected respectively to the outputs of the second main multi-mode interferometer $3_2$ and one output delivering an optical signal with an accumulated phase shift equal either to 0, or to π/2, or to π, or else to 3π/2. So, it acts as a [2:1] phase shifter introducing a 0 or π/2 phase shift.

As illustrated in the non-limiting example of FIG. 3, the device 1 may further comprise an amplifier 7 arranged for amplifying each optical signal with an accumulated phase shift, delivered by the output of the third main multi-mode interferometer $3_3$. Such an amplifier 7 may be, for instance, an integrated semiconductor optical amplifier (or SOA). But it could be also an external amplifier. This device 1 is a variant of the device 1 illustrated in FIG. 1.

Figure 4:
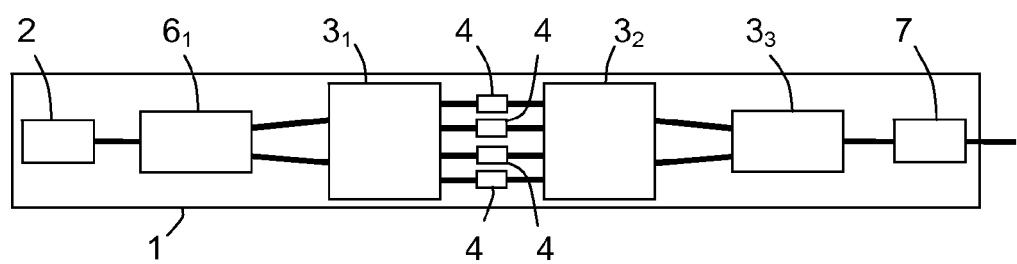
FIG. 4 schematically and functionally illustrates a fourth example of embodiment of a device according to the invention.

In the fourth example of embodiment schematically illustrated in FIG. 4, the device 1 comprises an auxiliary multi-mode interferometer $6_1$, a first main multi-mode interferometer $3_1$, four modulators 4, a second main multi-mode interferometer $3_2$, and a third main multi-mode interferometer $3_3$.

The auxiliary multi-mode interferometer $6_1$ comprises one input for receiving optical signals generated by the optical source 2 and two outputs delivering optical signals without phase shift. So, it acts as a [1:2] optical signal splitter.

The first main multi-mode interferometer $3_1$ comprises two inputs receiving the optical signals without phase shift (delivered by the auxiliary multi-mode interferometer $6_1$) and four outputs delivering four optical signals with phase shifts respectively equal to $\pi/2$, 0, 0 and $\pi/2$. So, it acts as a [1:4] optical signal splitter introducing $\pi/2$, 0, 0 and $\pi/2$ phase shifts.

The second main multi-mode interferometer $3_2$ comprises four inputs coupled respectively to the outputs of the first main multi-mode interferometer $3_1$ via the four modulators 4 and two outputs each delivering an optical signal with a phase shift equal either to 0 or to $\pi$. So, it acts as a [4:1] phase shifter introducing a $\pi/2$ or 0 phase shift.

The third main multi-mode interferometer $3_3$ comprises two inputs connected respectively to the outputs of the second main multi-mode interferometer $3_2$ and one output delivering an optical signal with an accumulated phase shift equal either to 0, or to $\pi/2$, or to $\pi$, or else to $3\pi/2$. So, it acts as a [2:1] phase shifter introducing a 0 or $\pi/2$ phase shift.

As illustrated in the non-limiting example of FIG. 4, the device 1 may further comprise an amplifier 7 arranged for amplifying each optical signal with an accumulated phase shift, delivered by the output of the third main multi-mode interferometer $3_3$. Such an amplifier 7 may be, for instance, an integrated semiconductor optical amplifier (or SOA). But it could be also an external amplifier. This device 1 is another variant of the device 1 illustrated in FIG. 1.

In every embodiment described above the device 1 may advantageously comprise an InP substrate on which each multi-mode interferometer $3_j$ or $6_k$ is defined. Indeed this InP substrate is the only material allowing a monolithical integration of all transmitters (including the laser 2 and the amplifiers 7) at telecom wavelengths. In this case, each modulator 4 may comprise a waveguide core that is advantageously made of AlGaInAs/InP quantum well(s) defined on the InP substrate. This type of quantum well provides the best EAM performance today. Such a material choice leads to record small size of the device 1.

But, other types of semiconductor and material for waveguide core (such as GaInAsP/InP, GaAs, or AlGaN) could be used for different wavelengths.

All passive elements could also be made in silicon photonic technology providing lower propagation loss and better optical phase resilience versus wavelength. However, in this case all active components of III-V semiconductors (EAM switches 4, laser 2 and SOAs 7) have to be hybridized on a common substrate (for instance in silicon (or Si)).

The invention provides a major simplification of semiconductor IQ modulators and/or transmitters by removing all active phase shifters and replacing them by passive phase shifters. This allows to design IQ devices with equal arms (or paths) that are easier to produce with higher yields and that have smaller sizes and are cheaper.

It should be appreciated by those skilled in the art that any block diagram herein represent conceptual views of illustrative circuitry embodying the principles of the invention.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A device for transmitting and/or modulating in-phase and quadrature optical signals generated by an optical source comprising:
   a. modulators, each arranged for modulating intensity of optical signals depending on commands; and
   b. at least three main multi-mode interferometers set in series and arranged for transforming in combination a received optical signal with an initial phase state into a final optical signal with a final phase state differing from the initial phase state by an accumulated phase shift of 0, $\pi/2$, $\pi$, or $3\pi/2$ and depending on the intensity modulations carried out by the modulators
   c. at least one part comprising:
      i. a first auxiliary multi-mode interferometer comprising one input for receiving optical signals and two outputs delivering optical signals without a phase shift;
      ii. two first main multi-mode interferometers set in parallel and each comprising one input receiving an optical signal without a phase shift and two outputs delivering two optical signals with phase shifts respectively equal to 0 and $\pi/2$;
      iii. two second main multi-mode interferometers set in parallel and each comprising two inputs coupled respectively to the outputs of a first main multi-mode interferometer via two modulators and one output delivering an optical signal with a phase shift equal either to 0 or to $\pi$; and
      iv. a third main multi-mode interferometer comprising two inputs connected respectively to the outputs of the two second main multi-mode interferometers and one output delivering an optical signal with an accumulated phase shift equal one of 0, $\pi/2$, $\pi$, or $3\pi/2$.

2. The device according to claim 1, wherein the modulators are electro-absorption modulators located between outputs of at least one main multi-mode interferometer and inputs of at least another main multi-mode interferometer.

3. The device according to claim 1, wherein the optical source is a distributed feedback laser.

4. The device according to claim 1, wherein the optical source is tunable.

5. The device according to claim 1 comprising:
   a. two parts set in parallel;
   b. a second auxiliary multi-mode interferometer comprising one input for receiving optical signals generated by the optical source and two outputs delivering optical signals without a phase shift for the two parts; and
   c. a controller coupled to the outputs of the third main multi-mode interferometers and arranged for combining the optical signals with their delivered accumulated phase shift.

6. The device according to claim 1, wherein each part comprises an amplifier arranged for amplifying each optical signal with an accumulated phase shift delivered by the output of the third main multi-mode interferometer.

7. The device according to claim 1, wherein each multi-mode interferometer is defined on an InP substrate, and each modulator comprises a waveguide core made of AlGaInAs/InP quantum wells defined on the InP substrate.

\* \* \* \* \*